United States Patent
Antoni et al.

(10) Patent No.: US 10,426,074 B2
(45) Date of Patent: Oct. 1, 2019

(54) AGRICULTURAL MACHINE HAVING A FOLDING ASSISTANCE DEVICE

(71) Applicant: KUHN S.A., Saverne (FR)

(72) Inventors: Pascal Antoni, Schaeferhof (FR); Ludovic Lesieur, Bourscheid (FR); Michel Seemann, Metting (FR)

(73) Assignee: KUHN S.A., Saverne (FR)

( * ) Notice: Subject to any disclaimer, the term of this patent is extended or adjusted under 35 U.S.C. 154(b) by 98 days.

(21) Appl. No.: 15/671,174

(22) Filed: Aug. 8, 2017

(65) Prior Publication Data
US 2018/0049363 A1 Feb. 22, 2018

(30) Foreign Application Priority Data
Aug. 19, 2016 (FR) ...................... 16 57831

(51) Int. Cl.
*A01B 73/04* (2006.01)
*A01D 34/66* (2006.01)
(Continued)

(52) U.S. Cl.
CPC ............ *A01B 73/044* (2013.01); *A01B 73/04* (2013.01); *A01B 73/048* (2013.01);
(Continued)

(58) Field of Classification Search
CPC ..... A01B 73/044; A01B 73/04; A01B 73/048; A01B 73/00; A01D 78/1014; A01D 34/661; A01D 34/00
See application file for complete search history.

(56) References Cited

U.S. PATENT DOCUMENTS 3,683,601 A * 8/1972 Van der Lely ....... A01D 41/144
56/6
4,023,623 A * 5/1977 Anderson ............ A01B 73/044
172/311
(Continued)

FOREIGN PATENT DOCUMENTS

| CA | 1 197 130 | 11/1985 |
|---|---|---|
| EP | 0 443 338 A1 | 8/1991 |
| EP | 0 454 602 A1 | 10/1991 |

OTHER PUBLICATIONS

French Preliminary Search Report dated May 8, 2017 in French Application 16 57831, filed on Aug. 19, 2016 ( with English Translation of Categories of Cited Documents & Written Opinion).

*Primary Examiner* — Arpad Fabian-Kovacs
(74) *Attorney, Agent, or Firm* — Oblon, McClelland, Maier & Neustadt, L.L.P.

(57) ABSTRACT

An agricultural machine that has two sections hinged relative to each other is disclosed. An oblong hole is made in one of the two sections. The machine includes a connecting device that has an actuator configured to cause one section to pivot relative to the other, and a travel stop. The actuator supports a movable pivot rod with a longitudinal axis transverse to the oblong hole. The movable pivot rod is positioned to slide in the length of the oblong hole. The travel stop has a blocking state in which it obstructs the oblong hole, thereby limiting the sliding of the pivot rod in the oblong hole. The travel stop is able to achieve the blocking state from a free state in which it is mounted in a movable rotating manner relative to the oblong hole.

12 Claims, 2 Drawing Sheets

(51) Int. Cl.
    *A01B 73/00* (2006.01)
    *A01D 34/00* (2006.01)
    *A01D 78/10* (2006.01)
(52) U.S. Cl.
    CPC ............ *A01D 34/661* (2013.01); *A01B 73/00* (2013.01); *A01D 34/00* (2013.01); *A01D 78/1014* (2013.01)

(56) References Cited

U.S. PATENT DOCUMENTS

| | | | | |
|---|---|---|---|---|
| 4,050,523 A * | 9/1977 | Poland | | A01B 73/044 172/311 |
| 4,074,766 A * | 2/1978 | Orthman | | A01B 73/04 172/311 |
| 4,249,616 A * | 2/1981 | Moe | | A01B 73/044 172/311 |
| 4,316,511 A * | 2/1982 | Andersen | | A01B 73/044 172/456 |
| 4,324,296 A * | 4/1982 | Schenk | | A01B 73/044 172/311 |
| 4,328,869 A * | 5/1982 | Perelli | | A01B 73/044 172/311 |
| 4,878,545 A * | 11/1989 | Dyken | | A01B 73/04 172/776 |
| 4,923,017 A * | 5/1990 | Meek | | A01B 73/044 172/456 |
| 5,111,636 A | 5/1992 | Quirin | | |
| 5,921,325 A * | 7/1999 | Meek | | A01B 73/044 111/52 |
| 5,934,050 A * | 8/1999 | Neuerburg | | A01D 34/661 56/15.2 |
| 6,761,228 B2 * | 7/2004 | Dobson | | A01B 73/04 111/54 |
| 7,043,889 B2 * | 5/2006 | Rauch | | A01B 73/046 56/15.9 |
| 7,073,604 B1 * | 7/2006 | Dobson | | A01B 63/32 111/57 |
| 8,122,970 B2 * | 2/2012 | Palen | | A01B 73/046 172/311 |
| 2003/0182912 A1 * | 10/2003 | Boll | | A01D 34/661 56/14.7 |
| 2004/0069510 A1 | 4/2004 | Dobson et al. | | |

\* cited by examiner

AGRICULTURAL MACHINE HAVING A FOLDING ASSISTANCE DEVICE

BACKGROUND OF THE INVENTION

Field of the Invention

The present invention relates to the general technical field of agricultural machinery and, among others, machines including a foldable chassis that has a mid-section and at least one side section on each side of the mid-section. In a specific case, the agricultural machine is a coulter bar. It could also be a soil working machine such as a cultivator or a harrow, a fodder processing machine such as a gyrorake or more generally an agricultural machine with a folding chassis requiring the side sections to follow the terrain.

Discussion of the Background

In a type of machine including a first section on which a second folding section is mounted via a hinge, a jack is mounted at one end on the first section and supports at the end of its retractable rod a transverse pivot rod. This pivot rod is mounted in a sliding manner in an oblong hole made in the second section. When the second section folds up and the oblong hole is at 90 degrees to the axis of the movable rod and the centre of gravity of the foldable section has crossed the vertical plane passing through the hinge, the foldable section redescends by gravity towards the first section. The pivot rod then slides in the oblong hole and moves away from the end of the oblong hole. As a result, the foldable section is not in the desired position for transport. In addition, when the machine unfolds and the centre of gravity of the second section crosses the vertical plane passing through the hinge between the sections, the second section redescends by gravity. If the pivot rod is not at the expected end of the oblong hole, the second section will fall until the pivot rod abuts and the jack can hold the section. This fall risks causing damage in the jack, the hydraulic circuit or on the chassis if the jack gives under the weight of the second section.

In addition, depending on the weight, physiognomy and number of tools, the position of the centre of gravity of the foldable sections differs. Each weight and configuration of tools has a different centre of gravity and an optimal incline of the oblong hole (for example relative to the horizontal). Furthermore, the incline of the oblong hole is a difficult compromise to ensure that the tipping of the foldable section is suitable for all anticipated configurations of tools.

SUMMARY OF THE INVENTION

The invention aims to limit the sliding of the pivot rod supported by the actuator in the oblong hole in a position in which the actuator rod is at 90 degrees via a versatile structure that is simple to implement, easy to assemble and economical. It is also preferable for the side sections to be able to follow the terrain when they are in a work position.

The invention therefore concerns an agricultural machine with two sections hinged relative to each other, at least one oblong hole being made in one of the two sections, the machine including a connecting device that has an actuator configured to cause one section to pivot relative to the other, and a travel stop, the actuator supporting a movable pivot rod with a longitudinal axis transverse to the oblong hole, the movable pivot rod being positioned to slide in the length of the oblong hole. The invention is noteworthy in that the travel stop has a blocking state in which it obstructs the oblong hole, thereby limiting the sliding of the pivot rod in the oblong hole, the travel stop being able to reach the blocking state from a free state in which it is mounted in a movable rotating manner relative to the oblong hole.

As such, the agricultural machine has a device to limit the travel of the pivot rod in the oblong hole having a structure that is economical to implement and simple in its functioning, not requiring any manual intervention by the operator.

In addition, the presence of the stop enables a uniform machine design, as when the pivot rod does not rise in the oblong hole there is no need to design different machines for different configurations of tools. Also, the stop can be implemented on a wide range of inclines of oblong holes. The stop therefore serves as a safety element and is universal in the sense that it can be implemented on different types of agricultural machines that have one section that folds relative to another.

Advantageously, in the free state, the travel stop can be movable by rotation under the effect of its own weight during the rotation of one of the two sections relative to the other section.

This feature enables the movement of the travel stop to be connected to the rotation of the rotating section. It does not require a spring in order to be implemented. The travel stop is therefore particularly simple and economical to design and use.

Preferably, the rotational direction of the travel stop is opposite to the rotational direction of the section with the oblong hole.

This feature enables a gradual and steady automatic placement of the travel stop, unlike a stop that has the same rotational direction as the folded section and which would suddenly tip when passing through the vertical plane by its centre of gravity.

Advantageously, the blocking state is achieved when one of two sections folds up relative to the other by means of the actuator, and before a retractable rod of the actuator reaches a position at 90 degrees to an A1 longitudinal axis of the oblong hole.

Advantageously, the travel stop has a nose, a neck and an edge, the neck being a recess between the nose and the edge.

This structure with a recess enables the pivot rod to be enveloped at the end of the oblong hole during folding up or when the machine jumps during operation. As such, the travel stop is prevented from disengaging during normal use.

In a particularly advantageous embodiment, the travel stop is defined by lengths D1 to D4 relative to a pivot pin around which the stop is mounted in a pivoting manner, D1 being the distance between the pivot pin and the point of the nose that is furthest away from the pivot pin, D2 being the distance between the pivot pin and the point of the neck that is the closest to the pivot pin, D3 being the distance between the pivot pin and the point of the edge that is the furthest away from the pivot pin, D4 being the maximum distance between the pivot pin and the closest point of the pivot rod when the latter is in an end position abutted against an end surface of the oblong hole opposite the pivot pin, D3 being greater than D4, itself greater than D1, itself greater than or equal to D2.

These distances ensure that the travel stop is correctly placed in a blocking position for the pivot rod: relative movement of the pivot rod to the neck, where it is enveloped, abutment of the edge against the pivot rod and holding of the pivot rod in the neck while the machine is operated.

Advantageously, the travel stop has a blocking state in which the stop is immobilised by a lock in the position reached in the blocking state in which it obstructs the oblong hole and limits the sliding of the pivot rod in the oblong hole.

This structure allows a control of the working height and/or depth by preventing the sections from unintentionally folding up.

Advantageously in the blocked state, the travel stop can also be a vector for thrusting one of the sections against the other of the sections via the actuator, i.e. acting as an intermediate and thrust transfer element.

This further improves the control of the working height and/or depth.

Advantageously, in the blocked state, the travel lock has:
- an opening in the travel stop, facing the oblong hole;
- an additional fastening element housed in the opening and in the section on which the oblong hole is made, for example a rod, itself fastened by a peg.

In a special embodiment, a first section is a mid-section of the machine, while the second section is a side section that can be folded up above the first section.

BRIEF DESCRIPTION OF THE DRAWINGS

Other features and advantages of the invention will become apparent from the following description with regard to the attached drawings, which are only provided as non-exhaustive examples of the invention. In these drawings.

DESCRIPTION OF THE PREFERRED EMBODIMENT

Figure 1:
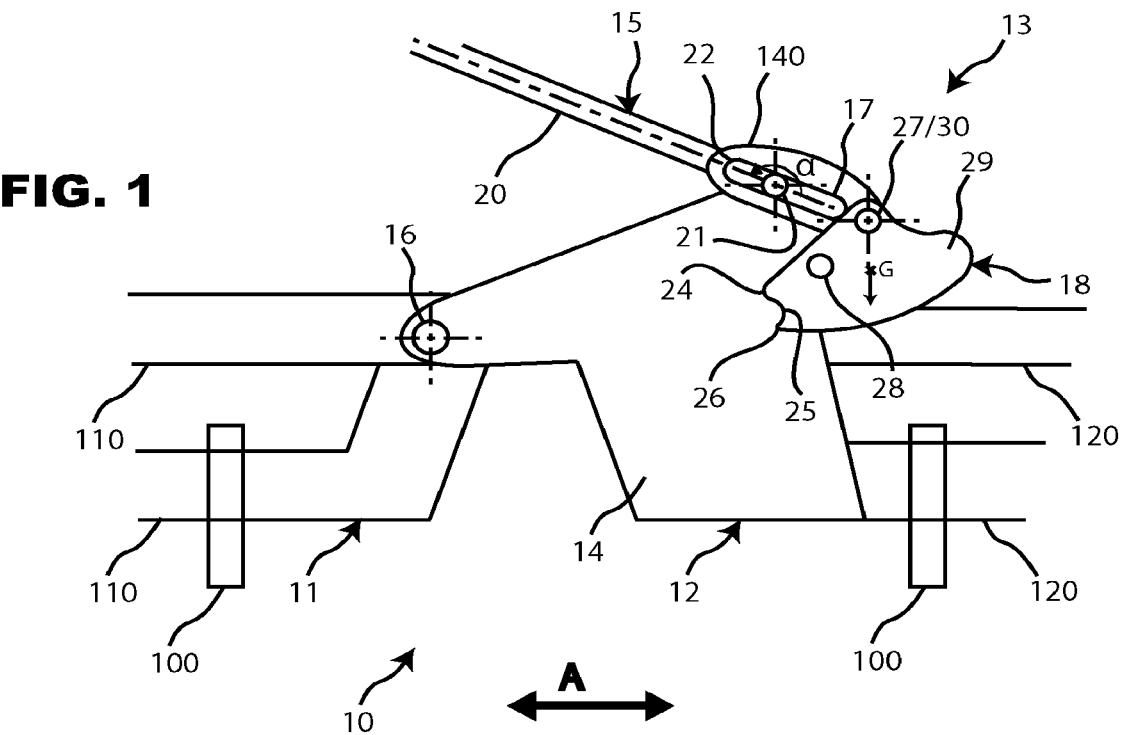
FIG. 1 is an elevation view of a connection between two sections of a foldable chassis of an agricultural machine in a work position.

FIG. 1 shows the connection between two sections 11 and 12 of the foldable chassis of an agricultural machine 10. Here, the sections 11 and 12 are generally laterally oriented in a direction A that crosses a general direction of advance of the machine 10.

In the example shown in FIGS. 1 to 4, the machine 10 is a coulter bar, the section 11 is a mid-section of the chassis and the section 12 is a side section. The section 11 then remains horizontal relative to the ground and the section 12 is foldable vertically or beyond vertical relative to the section 11. A similar connection not shown is provided symmetrically, on the other side of the mid-section 11 with a second side section.

The sections 11 and 12 each include one or several beams 110 or 120. The illustrated arrangement of the beams 110 and 120 is not restrictive, as they can be positioned at different heights and/or one behind the other in a planned direction of advance of the machine. The beams 110 or 120 of a single section 11 or 12 can support wheels (not shown) and one or several tools 100 that will be, but not restricted to, seeder elements, having rotors, cultivator shares or harrow tooths, portions of compaction rollers or other tools, potentially several different types combined, according to the type of machine, which then is a seeder, for example a disc seeder or tine seed drill, a planter, a gyrorake, a cultivator, a harrow or any other appropriate agricultural machine.

The beams 110 or 120 of a single section 11 or 12 are preferably but not restrictively fastened to each other, for example by welding, brazing, nut and bolt assemblies or any other appropriate means or method, alone or in combination.

The sections 11 or 12 are mounted to each other by means of a hinge 16. More specifically, in the non-restrictive example shown, the section 12 includes a flange 14 connected to the section 11 by the hinge 16. The flange 14 is for example supported by a lower beam 120.

The flange 14 additionally forms part of a connecting device 13 provided to allow the sections 11 and 12 to fold up relative to each other. The flange 14 has, here on its upper portion, two parallel end plates 140. An oblong hole 17 is made in each plate 140, the holes 17 being of the same orientation and preferably of the same length. The oblong holes 17 are preferably single holes, i.e. straight holes, i.e. further that the ends of a single oblong hole 17 are directly opposite each other (FIG. 1).

The connecting device 13 also includes an actuator 15, as well as at least one travel stop 18, called a weight with reference to the example shown and described.

The actuator 15 here is a double-acting jack. The actuator 15 includes a body 19 and a rod 20 that slides and retracts in the body 19. The end of the actuator 15 on the side of the body is mounted in a movable rotating manner, by a pivot or a ball joint, on a support secured to section 11. The end of the rod 20 opposite the body 19 has a transverse rod 21 called a mobile pivot rod, or more simply a pivot rod. The pivot rod 21 extends here transversely relative to the sliding rod 20, preferably parallel to the axis of the hinge 16. In the example shown, the rod 20 extends in the plane of the figures, while the pivot rod 21 crosses the plane of the figures.

Figure 4:
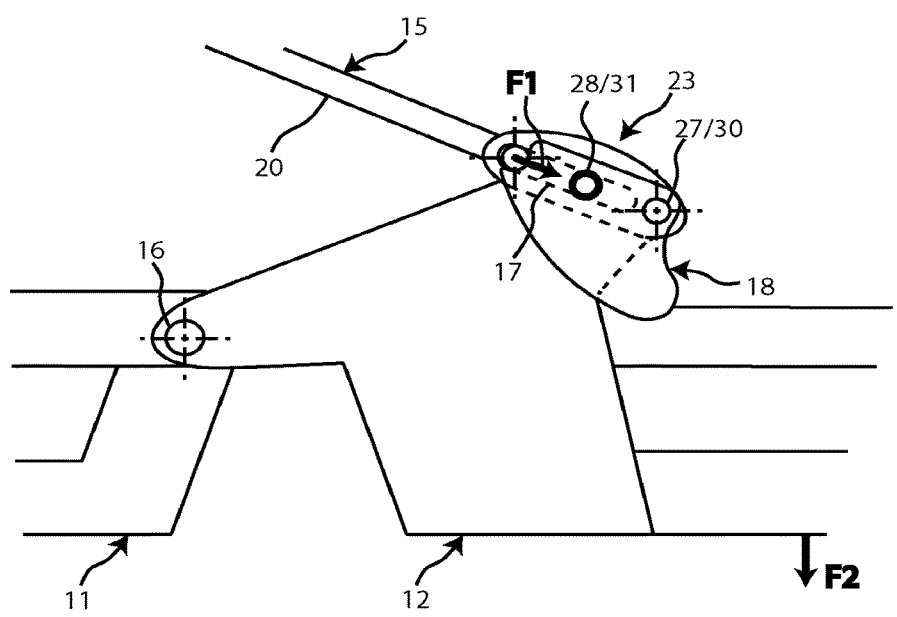
FIG. 4 is an elevation view of a variant of the use of the connection in the work position.

The pivot rod 21 is mounted in a sliding manner in the length of the oblong holes 17 so as to enable the rod 20 to move relative to the flange 14. At least one of the oblong holes 17 has an end surface 22 forming an abutment for the pivot rod 21, the surface 22 being positioned on the side of the actuator 15 in the work position (as seen in FIGS. 1 and 4).

The actuator 15 serves to fold or deploy the foldable section 12. When the actuator 15 is operating, the pivot rod 21 slides in the oblong holes 17 until it comes to rest against the surface 22. A slight pivoting of the pivot rod is possible during sliding, as the actuator 15 is mounted on a fixed point at its opposite end. Subsequently, as section 12 is folded up around the hinge 16, the rod 21 pivots in the oblong holes 17. The connection between the rod 21 and the oblong holes 17 can therefore function as a pivot and/or slide. Details on the operation of the machine 10 will be given later on in the text.

The weight 18 is in this case a plate, preferably metallic, for example made of steel or another metal or alloy. In the example shown, the weight 18 has on its outline a nose 24, a neck 25 and an edge 26 (see details in FIG. 5). The circumference of the weight 18 here follows a continuous profile between the nose 24, the neck 25 and the edge 26. The nose 24 and the edge 26 form two projections on this profile, while the neck 25 forms a recess between the nose 24 and the edge 26. Preferably, but not restrictively, the nose 24 and the neck 25 each include a surface that is a portion of a cylinder, respectively convex and concave. The neck 25 may then be formfitting with the pivot rod 21. The contact zone is then surface-based rather than linear, which maximises the longevity of the parts and the holding of the pivot rod 21 in the neck 25. Alternatively, the neck 25 can have a different profile, for example square, rectangle or another shape.

An opening 27 is further made in the weight 18. The opening 27 is located for example opposite the nose 24 along a longitudinal direction of the part. The opening 27 is a through opening with a circular cross-section.

Figure 2:
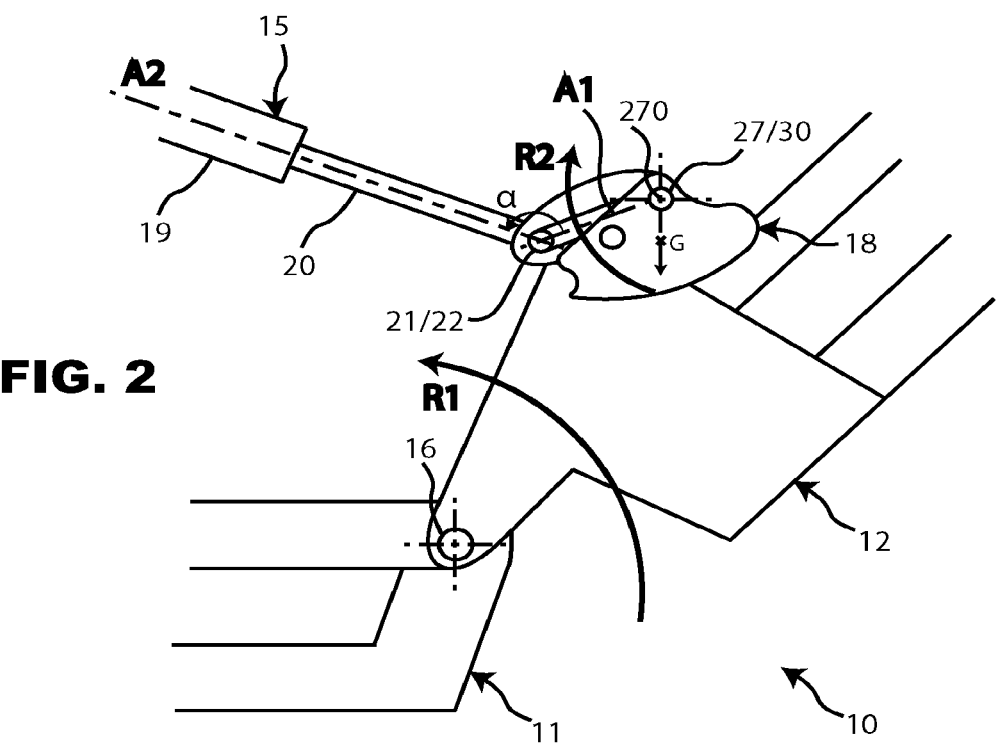
FIG. 2 is an elevation view of the elements in FIG. 1 in an intermediate position, during the folding up of one of the sections from a work position to a transport position, or during unfolding from a transport position.
Figure 5:
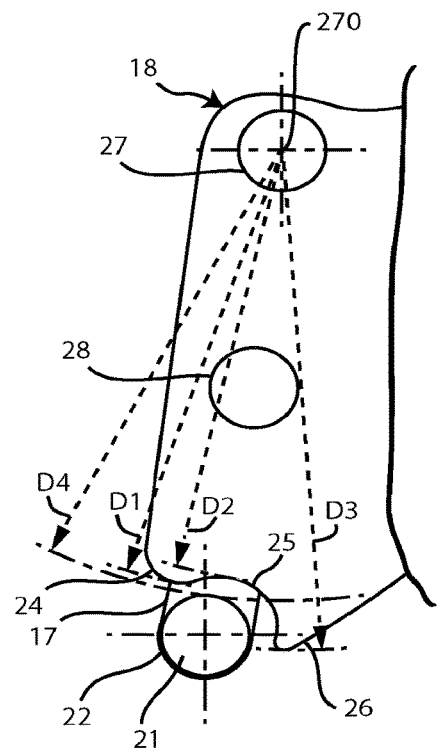
FIG. 5 is a detailed view of a weight visible for example in FIG. 1.

The weight 18 is here mounted in a pivoting manner on the plate 14 by means of a rod 30. The rod 30 is housed in the opening 27. In addition, the rod 30 can be housed in a socket fastened in at least one oblong hole 17, or even housed in a hole made directly in at least one plate 140. The rod 30 and the opening 27 extend along an axis 270 (FIGS. 2 and 5). The axis 270 forms a pivot pin and the weight 18 can turn around the axis 270 when the section 12 folds up or unfolds.

The weight 18 also has a protrusion 29 acting as a counterweight. The protrusion 29 is sized and located based on the weight given to the weight 18 and the desired position for the centre of gravity G of 18. When the weight pivots around the axis 270, the centre of gravity remains vertically below the axis 270 (FIGS. 1 and 2), until the nose 26 comes to rest against the pivot rod 21. The weight 18 therefore has a free state in which it can pivot, before coming to rest against the rod 21, and a blocking state in which it is in abutment against the pivot rod 21 and for which further details will be given subsequently. The transition between the free state and the blocking state is therefore achieved by the rotation of the weight 18 and by the weight coming into contact with the pivot rod 21.

FIG. 5 shows on a larger scale a detail of the weight 18. FIG. 5 also shows the pivot rod 21 in its end position, against the surface 22.

Different notable distances D1, D2, D3 and D4 help to size the weight 18 and more generally the device 13. These distances D1 to D4 are defined relative to the axis 270 around which the weight 18 pivots.

A first length D1 is the distance between the axis 270 and the point of the nose 24 the furthest away from the axis 270. The length D2 is the distance between the axis 270 and the point of the neck 25 the closest to the axis 270. The length D3 is the distance between the axis 270 and the point of the edge 26 the furthest away from the axis 270. Lastly, the length D4 is the maximum distance between the axis 270 and the point closest to the pivot rod 21 when the latter is in an end position, abutted against the surface 22.

The length D1 is less than the length D4 so that the nose 24 can pass beyond the rod 21 when the weight 18 is rotated.

The length D3 is less than the length D4 so that the edge 26 cannot pass beyond the rod 21, even when the rod 21 is abutted against the surface 22. Preferably, the difference between D3 and D4 is greater than a third of the radius of the rod 21. Again preferably, this difference is greater than the radius of the rod 21.

The length D2 is greater than the length D1 so that the rod 21 can easily fit inside and/or be held in the neck 25 when the rod slides in the oblong holes 17. Preferably, the difference between D2 and D1 is less than the radius of the rod 21. Again preferably, this difference is less than the radius of the rod 21. A significant difference between D1 and D2 ensures that the rod 21 is held in the neck 25.

Generally speaking, it is preferable for the dimensions D3, D4, D1 and D2 to be decreasing in this order, i.e. D3>D4>D1>D2.

An angle $\alpha$ is defined between the longitudinal axis A1 of an oblong hole 17 and the longitudinal axis A2 of the actuator 15. The axes A1 and A2 are considered in the plane of the figures that is perpendicular to the direction of advance of the machine 10. The angle $\alpha$ is situated on the side of the actuator 15 opposite to the section on which it is mounted in a rotating manner, here on the upper side (see FIGS. 1 to 3). The orientation of the longitudinal axis A1 of the oblong hole 17 is such that the latter does not intersect the axis of the hinge 16. As such, the jack 15 has a lever-arm sufficient to fold the section 12.

In the work position shown in FIG. 1, the angle $\alpha$ is a flat angle (not restrictively). The angle $\alpha$ can more generally be an obtuse angle, for example greater than 120 degrees, or an angle of over 180 degrees. A substantially flat angle $\alpha$, for example between 160 and 200 degrees, preferably 170 to 190 degrees, is to be preferred to limit friction between the rod 21 and the edges of the oblong holes 17, on the one hand, when following the terrain and, on another hand, when the actuator 15 is being retracted, before the rod 21 comes to rest against the surface 22. In this position, the weight 18 is movable by rotation around the rod 30 and the section 12 is floating. The section 12 can follow the terrain, i.e. follow changes in the profile of the ground by rotation in one direction or the other around the hinge 16 as the machine moves forward.

Figure 3:
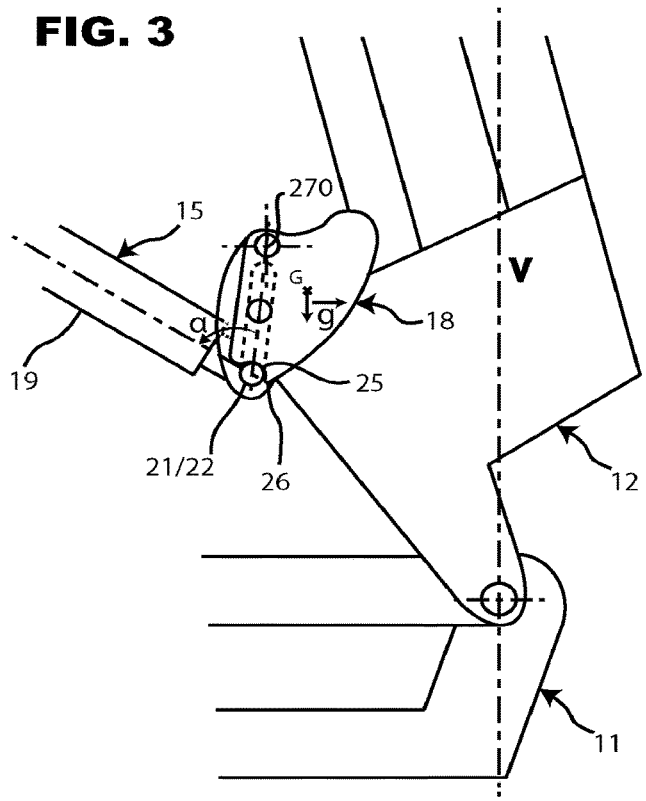
FIG. 3 is an elevation view of the elements in FIG. 1 in a transport position.

In the transport position, the angle $\alpha$ is preferably an acute angle, preferably less than 80 degrees, insofar as the section 12 is folded up beyond the vertical and/or the movable pivot rod 21 is held at one end of the oblong hole by the travel stop 18, as shown in FIG. 3. More specifically, the section 12 is folded beyond the vertical plane V above the mid-section 11. In other words, the section 12 has been folded by more than 90 degrees from the work position shown in FIG. 1, which is horizontal in the example shown. The edge 26 is then abutted against the pivot rod 21 of the end of the actuator 15, and the centre of gravity G of the weight is no longer vertically below the axis 270, as the contact against the rod 21 prevents the weight 18 from turning further.

To fold up the section 12 above the section 11 from the work position (FIG. 1) to the transport position (FIG. 3) via the intermediate position shown in FIG. 2, the actuator 15 is retracted. The pivot rod 21 slides in the oblong holes 17 until it comes to rest against the surface 22. Due to the retraction of the actuator 15, the section then rises off the ground and pivots around the hinge 16. As soon as the section 12 rises, the weight 18 pivots around the rod 30 under the effect of its own weight until the nose 24 passes beyond the pivot rod 21 and the rod 21 is facing the neck 25. The edge 26 then comes to rest against the pivot rod 21 and the weight 18 is held against the pivot rod 21 under the effect of its own weight. The actuator 15 continues to apply its retractive force and the section 12 continues to pivot around the hinge 16 into the transport position of the machine 10. In the example shown, not restrictively, the rod 20 of the actuator 15 is fully retracted. Alternatively, it can only be partially retracted.

During the entire folding process, the pivot rod 21 remains in the immediate proximity of the same end and/or is held by the weight 18 against a same end surface, the surface 22. The pivot rod 21 is also prevented by the weight 18 from returning to the other end of the oblong hole 17 until it comes to rest against the foldable section 12.

Significantly, in the absence of the stop 18, when the angle $\alpha$ reaches 90 degrees, the pivot rod 21 would tend to follow the edge of the oblong holes 17 on the side of the actuator 15, i.e. it would tend to rise in the oblong holes to follow the path of least resistance while the retractable rod 20 would tend to stay at 90 degrees of the longitudinal axis of the oblong holes 17, or in other words, the force exerted on the pivot rod 21 tends to remain normal on the edge of the oblong holes 17. In addition, the weight of the section 12 tends to cause it to fall towards the mid-section 11, which encourages the pivot rod 21 to rise in the oblong holes 17.

However, when the weight 18 is present, the rod 21 rests in the neck 25, which prevents it from dragging in the oblong holes 17. The weight 18 is therefore in the blocking state in which it limits, and preferably blocks (i.e. completely limits), the travel of the pivot rod 21 in the oblong holes 17 when the angle α crosses the 90-degree threshold while folding up. In the embodiment shown, the weight 18 envelops the pivot rod 21 in the blocking state.

The weight 18 is kept in this blocking state by its own weight. It can be seen that the weight 18 comes into contact with the pivot rod 21 before the angle α reaches or exceeds 90 degrees. The travel of the pivot rod 21 in the oblong holes 17 can be partially stopped if a displacement between the stop 18 and the rod 21 is deemed useful.

Furthermore, the weight 18 allows the pivot rod 21 to be directly in contact against the end surface 22 at the beginning of unfolding, which limits any latency at the start of this stage, the actuator 15 being directly able to repel the section 12.

To unfold the machine 10, the actuator 15 is deployed. As during folding up, the pivot rod 21 is held by the weight 18, which prevents it from rising in the oblong holes 17. When the centre of gravity of the section 12 crosses the plane V, the weight of the section 12 tends to cause it to lower towards the ground. The pivot rod 21 is then against the surface 22 and holds the section 12 during its lowering. The angle α increases beyond 90 degrees. Only then does the weight 18 move away from the pivot rod 21.

In the example shown, the direction of the rotation R2 of the weight 18 (around the rod 30) is opposite to the direction of the rotation R1 of the corresponding section (around the hinge 16). In the example in FIG. 2, when the section 12 folds up, the section 12 turns in an anticlockwise direction, while the weight 18 turns in a clockwise direction. Similarly, when the section 12 unfolds, the section 12 turns in the clockwise direction, while the weight 18 turns in the anticlockwise direction. When the edge 26 is not in contact with the pivot rod 21, the rotation R2 of the weight 18 is of an angle equal in absolute value to the angle of the rotation R1 of the section 12. The arrows R1 and R2 are only shown in reference to folding up for the sake of clarity.

The weight 18 can optionally be fitted with a position lock 23. In the embodiment shown, this position lock has a second opening 28 and a rod 31. This opening 28 is in this case a through opening. The opening 28 is made between the neck 25 and the opening 27. In FIG. 4, the rod 31 is driven into the opening 28 and into the neighbouring oblong holes 17. The rod 31 is held in position by means of pegs or any other appropriate fastening element (bolt, rivet, etc.).

The lock 23 prevents the weight 18 from turning relative to the rod 27, and therefore to the section 12 on which it is mounted. The lock 23 therefore keeps the weight 18 in the blocked position of the pivot rod 21 and the weight 18 obstructs the oblong holes 17. The weight is then in a blocked state in which an additional fastening element 31, separate from the rod 27 and the rod 21, is positioned on the weight 18 to prevent it from rotating relative to the section in which the oblong hole is made. Here, the additional fastening element is the rod 21, potentially supplemented by a lock pin.

The transition of the weight 18 to the blocked state can take place from a free state, for example when the section 12 is in a work position enabling the terrain to be followed, such as horizontally. The weight 18 then needs to be manually handled to align the additional fastening element 31 with at least one of the oblong holes 17. Placement in the blocked state can also be carried out from the blocked state, in which case the edge 26 is already abutted against the pivot rod 21. In all cases, the actuator 15 needs to be sufficiently retracted for the nose 24 to cross the pivot rod 21 before the fastening element is put in place. The blocking state and the blocked state correspond to two separate states identified by the relationship of the weight 18 to the neighbouring parts: one in which the weight 18 limits the sliding of the pivot rod 21, the other in which the weight 18 is immobilised by a third element against the section 12.

Thus, in the work position it is possible to apply a support force F1 on the weight 18, which results in the application of a downward support force F2 (FIG. 4). The forces F1 and F2 are shown without complying to any particular scale, and without being in proportion to each other. The application of the force F2 is particularly advantageous in certain work conditions to ensure uniform work of a consistent quality. Generally speaking, the application of the force F2 prevents the foldable section from unintentionally rising. In the case of a coulter bar or a soil working bar, this will for example enable work to be conducted at a significant and/or constant depth depending on the type of soil. This ensures consistent germination. In the case of a cutter bar or a roadside shredder, this will enable a force greater than gravity to be applied to the opposing upward force exerted by the plants processed. This maximises the yield and/or harmonises the cutting or shredding height.

Preferably, at least one second weight similar or identical to the weight 18 described above is positioned at the rear of the flange 14. Again preferably, the second weight is mounted on the same rod 30 as the first weight 18.

In a variant, the sections 11 and 12 are connected by at least one other hinge. The axis of this other hinge is then aligned with the axis of the hinge 16. This other hinge can itself be assisted by a connecting device 13 of the type described above, fitted with one or several weights 18.

In a variant, the flange 14 only includes one plate 140 provided with an oblong hole 17. The rod 20 of the actuator is then forked at its end to provide good stability for the pivot rod 21 relative to the flange 14, and therefore for the sections 11 or 12 of the chassis relative to each other. Reinforcers or thickeners can be placed on the plate 140 to ensure its resistance.

The connecting device 13 has been described in reference to the folding up of a side section 12 on a mid-section 11. It should be noted that the invention also covers the implementation of the connecting device 13 more generally on any foldable section or relative to another section, which may be fixed or itself foldable.

The hinge 16 described above has an axis parallel to the direction of advance of the machine 10. In a variant not shown, the axis of the hinge between the neighbouring sections connected by the connecting device is transverse to the direction of advance, for example perpendicular or oriented from 0 to 45 degrees relative to the direction of advance.

What is claimed as new and desired to be secured by Letters Patent of the United States is:

1. An agricultural machine comprising:
   first and second sections hinged to each other via a hinge;
   an oblong hole being made in a flange of one of the first and second sections; and
   a connecting device including:

an actuator which causes the second section to pivot relative to the first section, and a travel stop pivotally mounted on the flange, wherein the actuator includes a movable pivot rod which has a longitudinal axis transverse to the oblong hole, the movable pivot rod being arranged to slide in the oblong hole along a length of the oblong hole, wherein in a free state of the travel stop, the travel stop is rotatably movable relative to the oblong hole, and wherein in a blocking state of the travel stop, the travel stop obstructs the oblong hole such that the pivot rod abuts the travel stop, thereby limiting the sliding of the pivot rod in the oblong hole, the travel stop reaching the blocking state of the travel stop by rotating from the free state of the travel stop.

2. The agricultural machine according to claim 1, wherein, in the free state of the travel stop, the travel stop is movable by rotation under an effect of a weight of the travel stop during rotation of the second section relative to the first section.

3. The agricultural machine according to claim 2, a rotational direction of the travel stop is opposite to a rotational direction of the second section, the second section including the flange with the oblong hole.

4. The agricultural machine according to claim 1, wherein the blocking state of the travel stop is achieved during folding up of the second section relative to the first section using the actuator, and before a retractable rod of the actuator reaches a position at 90 degrees to a longitudinal axis of the oblong hole.

5. The agricultural machine according to claim 1, wherein the travel stop has a nose, a neck, and an edge, the neck being a recess provided between the nose and the edge.

6. The agricultural machine according to claim 5, wherein the travel stop is defined by lengths D1 to D4 relative to a pivot pin around which the travel stop is mounted in a pivoting manner, D1 being a distance between the pivot pin and a point of the nose that is furthest away from the pivot pin, D2 being a distance between the pivot pin and a point of the neck that is closest to the pivot pin, D3 being a distance between the pivot pin and a point of the edge that is furthest away from the pivot pin, D4 being a maximum distance between the pivot pin and a closest point of the pivot rod when the pivot pin abuts against the end surface of the oblong hole which is opposite the pivot pin, D3 being greater than D4, D4 being greater than D1, and D1 being greater than or equal to D2.

7. The agricultural machine according to claim 1, wherein in the blocked state of the travel stop, the travel stop is immobilized by a lock.

8. The agricultural machine according to claim 7, wherein, in the blocked state of the travel stop, the travel stop is a vector for thrusting the second section against the first section via the actuator.

9. The agricultural machine according to claim 7, wherein, in the blocked state of the travel stop, the travel stop has:

an opening in the travel stop opposite the oblong hole; and an additional fastening element housed in the opening and in the oblong hole.

10. The agricultural machine according to claim 1, wherein first section is a mid-section of the agricultural machine, and the second section is a side section that can be folded up above the first section.

11. The agricultural machine to claim 1, wherein, in the blocking state of the travel stop, the pivot rod abuts an end surface of the oblong hole.

12. The agricultural machine according to claim 5, wherein the nose includes a convex arcuate surface, the neck includes a concave arcuate surface, and the neck abuts the pivot rod in the blocked state of the travel stop.

* * * * *